United States Patent
Mason et al.

(10) Patent No.: US 9,380,679 B2
(45) Date of Patent: Jun. 28, 2016

(54) LUMINAIRE WITH TOUCH PATTERN CONTROL INTERFACE

(75) Inventors: Jonathan David Mason, Eindhoven (NL); Markus Gerardus Leonardus Maria Van Doorn, Eindhoven (NL); Igor Berezhnyy, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1024 days.

(21) Appl. No.: 13/383,662

(22) PCT Filed: Jul. 15, 2010

(86) PCT No.: PCT/IB2010/053227
§ 371 (c)(1),
(2), (4) Date: Mar. 16, 2012

(87) PCT Pub. No.: WO2011/007325
PCT Pub. Date: Jan. 20, 2011

(65) Prior Publication Data
US 2012/0161667 A1    Jun. 28, 2012

(30) Foreign Application Priority Data
Jul. 15, 2009   (EP) ................... 09165500

(51) Int. Cl.
| | |
|---|---|
| *G05F 1/00* | (2006.01) |
| *H05B 37/02* | (2006.01) |
| *F21V 23/04* | (2006.01) |
| *G06F 3/0488* | (2013.01) |
| *F21Y 101/02* | (2006.01) |
| *F21Y 105/00* | (2016.01) |

(52) U.S. Cl.
CPC ........ *H05B 37/0227* (2013.01); *F21V 23/0442* (2013.01); *F21V 23/0485* (2013.01); *G06F 3/0488* (2013.01); *F21Y 2101/02* (2013.01); *F21Y 2105/008* (2013.01)

(58) Field of Classification Search
USPC ........... 315/297, 291; 362/394, 395; 345/173, 345/174
See application file for complete search history.

(56) References Cited

U.S. PATENT DOCUMENTS

| | | | |
|---|---|---|---|
| 5,010,460 A | 4/1991 | Lin | |
| 6,997,772 B2* | 2/2006 | Fong | ........................ A63H 3/28 446/175 |

(Continued)

FOREIGN PATENT DOCUMENTS

| | | |
|---|---|---|
| CN | 2666081 Y | 12/2004 |
| CN | 201045470 Y | 4/2008 |

(Continued)

*Primary Examiner* — Lincoln Donovan
*Assistant Examiner* — Thomas Skibinski
(74) *Attorney, Agent, or Firm* — Meenakshy Chakravorty

(57) ABSTRACT

The present invention relates to a luminaire (100) comprising a plurality of controllable light sources (106), a touch sensitive member (108) configured to detect a position of a point of touch of a user touching the touch sensitive member (108) and to output sets of positioning information indicative of the point of touch, and a control unit configured to receive positioning information from the touch sensitive (108) member, to determine a touch pattern based on a plurality of received sets of positioning information, to select one of a plurality of predetermined illumination patterns corresponding to the determined touch pattern, and to control the plurality of controllable light sources (106) according to the selected illumination pattern. By means of the invention there is provided a user interface for controlling the luminaire (100) to emit different illumination patterns depending on which areas and for which duration of time the user touches the touch sensitive member (108) of the luminaire (100).

17 Claims, 2 Drawing Sheets

(56) References Cited

U.S. PATENT DOCUMENTS

| | | | |
|---|---|---|---|
| 7,258,469 B2 * | 8/2007 | Manico | H03K 17/962 200/314 |
| 2002/0067144 A1 * | 6/2002 | Hoffknecht | H05B 39/085 315/291 |
| 2002/0153780 A1 | 10/2002 | Wolff | |
| 2002/0190961 A1 * | 12/2002 | Chen | G06F 3/044 345/173 |
| 2007/0152977 A1 * | 7/2007 | Ng | G06F 3/03547 345/173 |
| 2008/0232114 A1 * | 9/2008 | Verhaegh | F21V 7/22 362/341 |

FOREIGN PATENT DOCUMENTS

| | | |
|---|---|---|
| GB | 2358296 A | 7/2001 |
| JP | 01227301 A | 9/1989 |
| JP | 200299080 A | 10/2000 |
| JP | 2002280189 A | 9/2002 |
| JP | 2008293946 A | 12/2008 |
| JP | 2009116352 A | 5/2009 |
| WO | 03059016 A1 | 7/2003 |
| WO | 2007132382 A2 | 11/2007 |
| WO | 2008013350 A2 | 1/2008 |
| WO | 2009042424 A1 | 4/2009 |

* cited by examiner

LUMINAIRE WITH TOUCH PATTERN CONTROL INTERFACE

TECHNICAL FIELD

The present invention relates to a control method for a luminaire, specifically to a control method receiving a touch pattern input from a user. The invention also relates to a luminaire having a touch pattern control interface.

BACKGROUND OF THE INVENTION

Recently, much progress has been made in increasing the brightness of light emitting diodes (LEDs), also in relation to "small" LEDs having a compact form factor. As a result, LEDs have become sufficiently bright and inexpensive to serve as a light source in for example lighting systems with adjustable color. By mixing differently colored LEDs any number of colors can be generated, e.g. white. An adjustable color lighting system is typically constructed by using a number of primary colors, and in one example, the three primaries red, green and blue are used. The color of the generated light is determined by the LEDs that are used, as well as by the mixing ratios. To generate "white", all three LEDs have to be turned on. By using LEDs it is also possible to decrease the energy consumption, a requirement which is well in line with the current environmental trend.

As a further consequence of having the possibilities to provide bright light even when using compact LEDs, a number of different lighting systems have been proposed greatly differing from the standard lighting systems comprising a common light bulb. In line with this and by using LEDs instead of light bulbs, a user is also given a more flexible control of the illumination functionalities of the lighting systems, for example in relation to intensity dimming.

An example of such a lighting system is disclosed in U.S. Pat. No. 7,258,469, where an integral contact-sensitive layer located over the light-emitting surface of a flat-panel touch lamp controls the activation and deactivation of the lamp. The light-emitting surface of this flat-panel touch lamp may be activated (to emit light) or deactivated by means of a user's touch of the light-emitting surface.

However, even though the touch lamp of U.S. Pat. No. 7,258,469 provides improved functional control, it is limited to static activation/deactivation of the light-emitting surface of the lamp, and it may thus be desirable to provide even more intuitively adapted user control of a lighting system, such as a luminaire, for example regarding more degrees of control of the luminaire illumination functionalities.

SUMMARY OF THE INVENTION

According to an aspect of the invention, the above is at least partly met by a luminaire comprising a plurality of controllable light sources, a touch sensitive member configured to detect a position of a point of touch of a user touching the touch sensitive member and to output sets of positioning information indicative of the point of touch, and a control unit configured to receive positioning information from the touch sensitive member, to determine a touch pattern based on a plurality of received sets of positioning information, to select one of a plurality of predetermined illumination patterns corresponding to the determined touch pattern, and to control the plurality of controllable light sources according to the selected illumination pattern.

The general concept of the present invention is based on the fact that it may be possible to allow for individual control of a plurality of light sources according to a selected one of a plurality of predetermined illumination patterns that corresponds to a touch pattern created by the user upon touching the touch sensitive member of a luminaire. Accordingly, by means of the invention there is provided an intuitive and advantageous user interface, providing the user with a flexible solution allowing different illumination patterns to be provided, depending on which areas and possibly the duration of time that the user touches the touch sensitive member of the luminaire.

In an embodiment, the touch sensitive member may comprise at least one of a resistive-type sensitive surface and capacitive-type sensitive surface, for example forming a transparent touch sensitive foil, and be further configured to output positioning information corresponding to an area of touch of a user touching the touch sensitive member. The touch sensitive member may also be arranged adjacent to a diffuser of the luminaire. Also, the diffuser may form a shade for the luminaire, providing a visible covering for the luminaire.

By providing the touch sensitive member together with a shade of the luminaire, it may be possible to detect the coordinates of a person's finger or hand, and based on the coordinates indicate which of the light sources is to be either activated or deactivated. This means that the user may explicitly define where the light will come from that is incident on the luminaries' shade/diffuser. Additionally, the light sources may also, or instead, line the inside of the shade/diffuser and may be individually controllable. Possibly, a selected set of the plurality of light sources may face inwards to illuminate the inside of the shade/diffuser so that light can come from the inside in the same manner as from a traditional luminaire comprising a light bulb.

By detecting not only a position of a point of touch of a user touching the touch sensitive member, but also an area of touch of a user touching the touch sensitive member, and possibly the duration of touch, it may be possible to control the luminaire to emit complex illumination patterns selected from a plurality of predetermined illumination patterns stored by the control unit. For example, it may be possible to detect the movement of a hand of the user (e.g. large area) across the touch sensitive member of the luminaire, and allow e.g. all light sources in the corresponding touched area to be activated/deactivated depending on a detected direction of touch. Additionally, the speed and/or duration of the movement may be used for controlling the intensity, color and/or color temperature of the light output. Furthermore, touching/tapping only small portions (e.g. small areas) of the touch sensitive member may activate small illumination areas (e.g. at least one light source) or areas in relation to the area of the touch/ tap (e.g. one, two fingers, or whole hand).

Preferably, the light sources may comprise at least a light emitting diode (LED). Furthermore, to achieve high energy efficiency the light source may preferably be selected from a group comprising light emitting diodes (LEDs), organic light emitting diodes (OLEDs), polymeric light emitting diodes (PLEDs) and inorganic LEDs. As mentioned above, LEDs have a much higher energy efficiency in comparison to conventional light bulbs which generally deliver at best about 6% of their electric power used in the form of light. The skilled person will appreciate that it would of course be possible to use a standard incandescent light source, such as an argon, krypton, and/or xenon light source. In an even more preferred embodiment, the light source may for example comprise a combination of at least some of red, green, blue, yellow, magenta and cyan LEDs for creating mixed color lighting. It is however also possible to use one or a plurality of white LEDs of the same or a different color temperature (e.g. warm white and cold white). Further combinations are of course also possible.

Alternatively, the luminaire may further comprise at least one of a moisture sensor, a microphone and a vibration sensor for providing sensing information to the control unit, and the control unit may be further configured to provide further control of the plurality of controllable light sources according to a selected one of a plurality of predetermined illumination patterns corresponding to the determined touch pattern. For example, moist air (e.g. a user's breath or moisture in a steamy bathroom) detected by the moisture sensor may result in variation of emitted color and/or activation/deactivation of a sub-set of the light sources. Similarly, the detection of a specific sound pattern by means of the microphone(s) may be used to generate a specific illumination pattern, whereas detected vibration may be used in a corresponding manner for controlling the luminaire to emit light according to specific illumination patterns.

In an embodiment the luminaire may be arranged to further comprise communication means connected to the control unit and configured to provide at least one of the determined touch pattern and the selected illumination pattern to a corresponding different luminaire. Such means may comprise means for light and/or RF transmission, e.g. WiFi, Zigbee, etc., allowing combined control not only of one luminaire but a plurality of luminaires. A combination of wireless and wired communication may be possible and falls within the scope of the invention. Also, the luminaire may be adapted to receive for example an additional predetermined illumination pattern (e.g. to be stored by the control unit), such as for example provided by means of light control software being executed on an external computer.

According to another aspect of the invention there is provided a method of controlling an illumination pattern of a luminaire, the luminaire comprising a plurality of controllable light sources and a touch sensitive member, the method comprising detecting a position of a point of touch of a user touching the touch sensitive member, determining a touch pattern based on a plurality of detected points of touch, selecting one of a plurality of predetermined illumination patterns corresponding to the determined touch pattern, and controlling the plurality of controllable light sources according to the selected illumination pattern. This aspect of the invention provides similar advantages as discussed above in relation to the previous aspect of the invention.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

The various aspects of the invention, including particular features and advantages, will be readily understood from the following detailed description and the accompanying drawings, in which.

DETAILED DESCRIPTION

Figure 1:
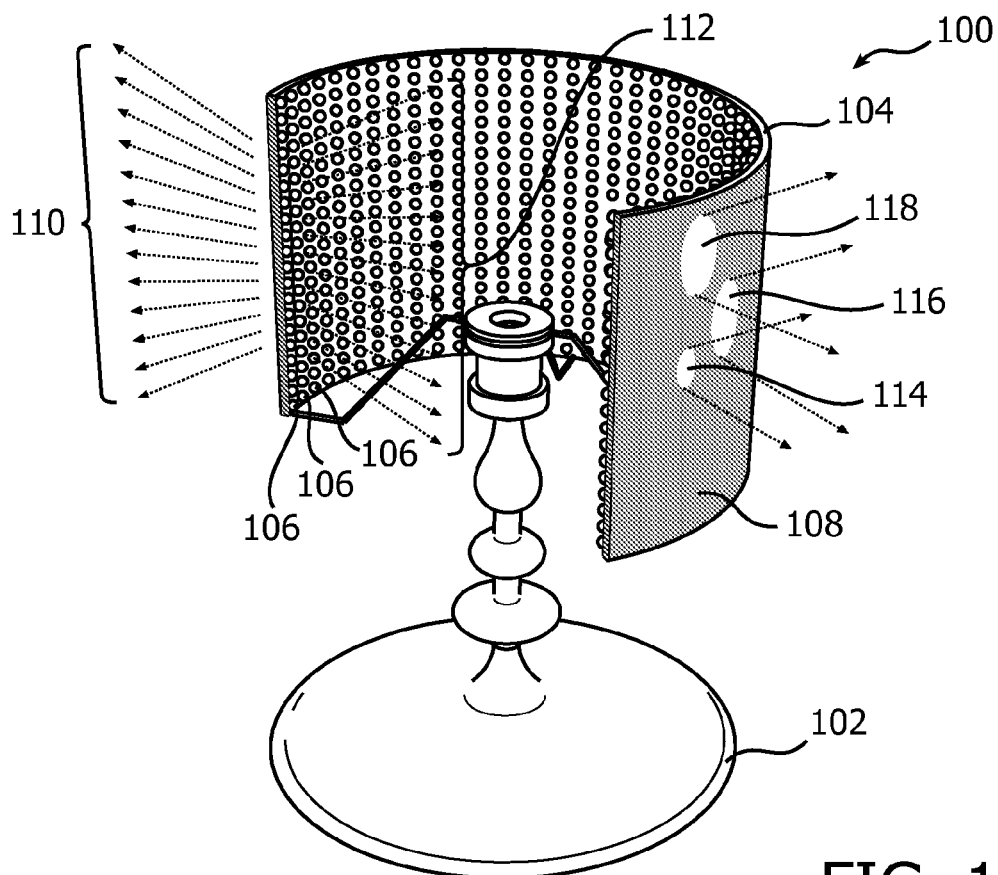
FIG. 1 illustrates a luminaire according to currently preferred embodiments of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a perspective view of a luminaire 100 comprising a base 102 and a lamp shade 104. On the inside of the lamp shade 104 there are provided a plurality of LEDs 106, and on the outside of the lamp shade 104 there are arranged a (at least semi-transparent) layer having a touch sensitive surface 108 configured to sense a point of touch of a user (e.g. "pixel based sensing"). In the embodiment of FIG. 1, the plurality of LEDs 106 are configured to emit light in at least two directions, a first direction 110 being mainly towards the external surroundings of the luminaire 100 and the second direction 112 being mainly towards the center of the luminaire 100, e.g. for creating an illumination pattern corresponding to the one created using a prior art luminaire comprising a lamp bulb. It is of course possible, and within the scope of the invention, to allow the LEDs 106 to only emit in the first 110 and/or the second 112 direction and/or in any other direction, e.g. mainly upwards and/or mainly downwards.

The luminaire 100 further comprises a control unit (not shown but possibly incorporated in the base 102) configured so as to be in electrical connection with the touch sensitive surface 108 and configured to execute the method steps according to the invention. The control unit may include a microprocessor, microcontroller, programmable digital signal processor or another programmable device. The control unit may also, or alternatively, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include a computer executable code that controls the operation of the programmable device.

Also, the control unit may comprise functionality configured for wireless communication of the control data to, and from, one or a plurality of luminaires similar to luminaire 100 and arranged e.g. in the same room as the luminaire 100. Such a lighting system 300 comprising a plurality of luminaires is discussed below in relation to FIG. 3. The wireless communication functionality may include for example light (e.g. IR) and/or RF transmission of the control data. Also a wired (or combined wireless and wired) connection between the luminaire 100 and further similar luminaires may be included. The wired/wireless connectivity may also be used for external connection to the control unit, e.g. for providing additional predetermined illumination patterns.

Figure 2:
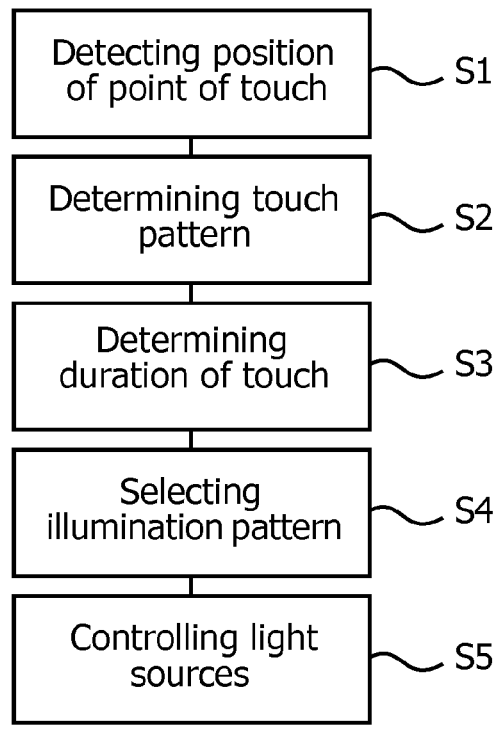
FIG. 2 is a flow chart illustrating the control steps of a control unit comprised in a luminaire according to the invention.

During operation of the luminaire 100, with parallel reference to the flowchart of FIG. 2, the process is initiated by a user touching the lamp shade 104 of the luminaire 100. In a first step, S1, the touch sensitive surface 108 of the lamp shade 104 detects a position of the point of touch of the user, for example any one, or all of, areas 114, 116 and 118 or any other parts of the touch sensitive surface 108. As a consequence of the touching of the touch sensitive surface 108, the touch sensitive surface 108 relays information as to the position of touch to the control unit, wherein in a second step, S2, the control unit determines a touch pattern, based on a plurality of detected points of touch from the touch sensitive surface 108. In an optional third step, S3, the control unit also determines the duration of touch and takes this information into account and correlates it with the determined touch pattern for a fourth step, S4, where the control unit selects one of a plurality of predetermined illumination patterns corresponding to the determined touch pattern (and optionally the duration of touch). In the present embodiment of FIG. 1, the control unit selects an illumination pattern that corresponds to the actual areas of touch, and activates these areas, in a fifth step S5, such that a plurality of LEDs 106 corresponding to the touched areas, e.g. areas 114, 116 and 118 of the lamp shade 104 are activated to emit light.

However, many different options are available for controlling the LEDs 106. For example, it may be possible to detect when the user moves a finger or fingers across the touch sensitive surface 108 and, as a response, draw a pattern from which the light will appear. Also, a dimming function may be included where the duration of the hand or finger motion is taken into account along with the coordinates. For example, the more slowly the user moves his hand or finger over the touch sensitive surface 108, the brighter the LEDs 106 become in visual increments. Additionally, different options for controlling the color of the LEDs 106 are possible; including for example the option to allow the user to pass a hand or finger(s) over the touch sensitive surface 108 and allow the LEDs 106 to scroll through the different colors that may be emitted by the luminaire 100, and select a specific color by e.g. removing the hand or finger(s) from the touch sensitive surface 108.

Additionally, by means of the possible wireless connectivity to the luminaire 100, it may be possible to add additional predetermined illumination patterns that may be selected. For example, the user may download illumination patterns to the luminaire 100 created by himself/herself using specific software and/or illumination patterns created by a lighting designer. Possibly, other connectivity options may be available (e.g. for reception of a USB stick, SD card, etc.). Also, specifically dedicated areas of the touch sensitive surface 108 may also be used for "teaching" the luminaire 100 new illumination patterns. In an optional embodiment the luminaire 100 may also be equipped with further sensing options, including for example (but not limited to) a moisture sensor, a microphone and a vibration sensor for providing sensing information to the control unit. In turn, the control unit may correlate the sensing information from the optional sensors to select (?) further illumination patterns, e.g. moisture sensing, sound sensing, and/or vibration sensing may result in the selection of corresponding illumination patterns.

Figure 3:
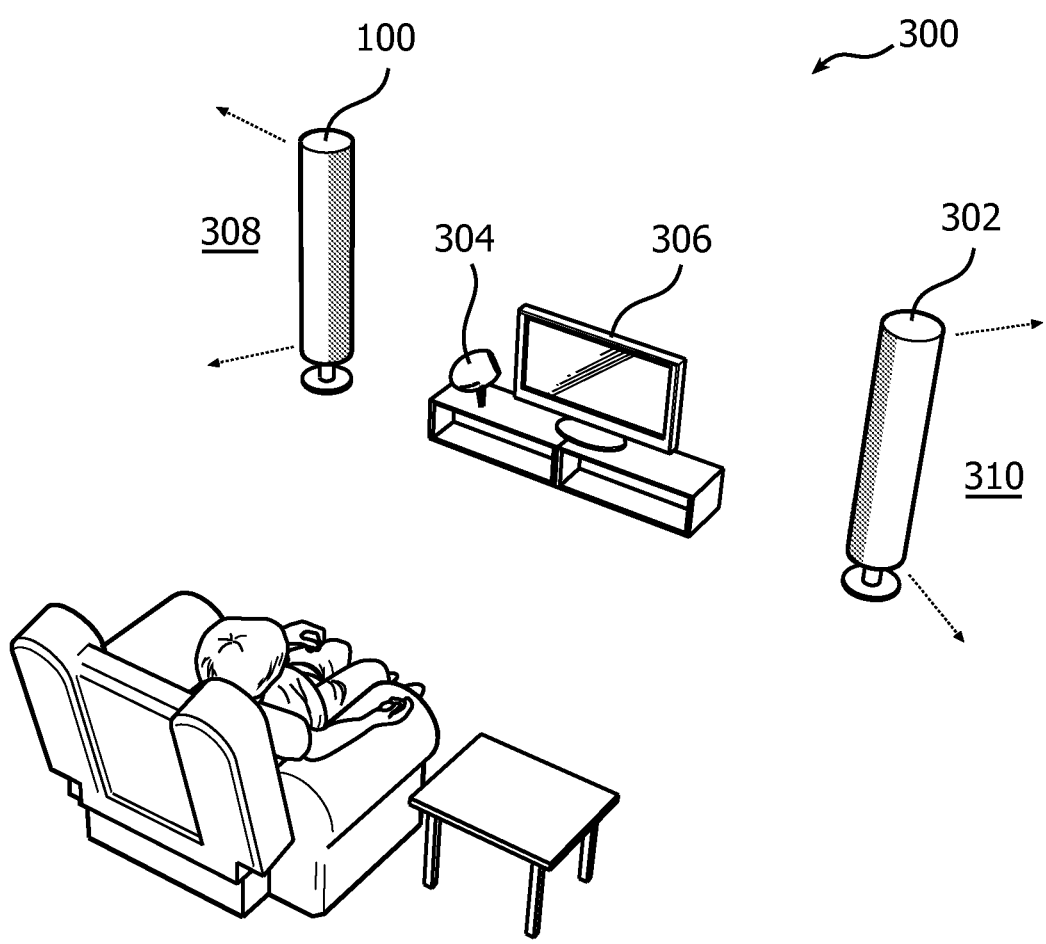
FIG. 3 illustrates a lighting system comprising a plurality of luminaires according to the invention.

Turning now to FIG. 3, which illustrates an embodiment of a lighting system 300 comprising a plurality of luminaires. In the embodiment, a number of luminaires 100 (similar to the luminaire of FIG. 1), 302 are linked together, thereby allowing for a user to create a pattern on a first luminaire 100 and transmit the pattern to a second luminaire 302 for creating a matching illumination pattern that possibly may be placement and depending on further devices. Such further, and possibly controllable devices may e.g. comprise a differently typed luminaire 104 and/or a TV set 306. Accordingly, based on user controlled illumination pattern 308 created by touching the first luminaire 100, the other connected devices 302, 304 and/or 306 may be adapted to create a matching illumination pattern that corresponds to the illumination pattern provided by the first luminaire 100. As an example, the second luminaire 302 may be adapted to provide an illumination pattern 310 essentially being an "inverse" illumination pattern as compared to the illumination pattern 308 of the first luminaire 100 depending on its placement in relation to the TV set 306 and the first luminaire 100.

In summary, the present invention relates to a luminaire, comprising a plurality of controllable light sources, a touch sensitive member configured to detect a position of a point of touch of a user touching the touch sensitive member and to output sets of positioning information indicative of the point of touch, and a control unit configured to receive positioning information from the touch sensitive member, to determine a touch pattern based on a plurality of received sets of positioning information, to select one of a plurality of predetermined illumination patterns corresponding to the determined touch pattern, and to control the plurality of controllable light sources according to the selected illumination pattern. By means of the invention it is provided a user interface for controlling the luminaire to emit different illumination patterns depending on which areas and duration of time that the user touches the touch sensitive member of the luminaire.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, the luminaire may be provided as a complete unit comprising e.g. shade/diffuser, LEDs, stand, base, etc. Alternatively, the shade/diffuser and LEDs could be retro fitted to existing stands and bases by securing into the original lamp socket. Additionally, it may be possible to change the emitted illumination pattern using additional input means such as a remote control, or any other device having wireless connectivity for connecting to the luminaire, e.g. a WiFi enabled mobile phone such as an iPod or similar. Also, allowing connectivity of the luminaire to e.g. the Internet, e.g. a change of the content on a specific web page such as a Facebook or MySpace web page, a received message (e.g. MSN, ICQ, etc.), or even an RSS feed may initiate a change of emitted illumination pattern. Furthermore, in the claims, the word "comprising" does not exclude other elements or steps, and the indefinite article "a" or "an" does not exclude a plurality.

The invention claimed is:
1. A luminaire, comprising:
a plurality of controllable light sources configured to emit light towards the external surrounding of the luminaire;
a touch-sensitive member configured to detect positions of points of touch of a user touching the touch-sensitive member and to output sets of positioning information indicative of the points of touch; and
a control unit configured to receive the sets of positioning information from the touch-sensitive member, to determine a touch pattern based on the received sets of positioning information, to select one of a plurality of predetermined illumination patterns corresponding to the determined touch pattern, and to control the plurality of controllable light sources according to the selected illumination pattern,
wherein the luminaire is configured in a lamp shade shape and wherein the plurality of controllable light sources further emit light inwards towards an internal space of said lamp shade shape to form a lamp bulb illumination pattern.

2. Luminaire according to claim 1, further comprising a diffuser, wherein at least one of the light sources and the touch-sensitive member are arranged adjacent to the diffuser.

3. Luminaire according to claim 2, wherein the diffuser forms a shade for the luminaire.

4. Luminaire according to any claim 1, wherein the light sources comprise a plurality of LEDs.

5. Luminaire according to claim 4, wherein the LEDs are selected from a group consisting of: OLEDs, PLEDs, and inorganic LEDs.

6. Luminaire according to claim 1, wherein the touch-sensitive member comprises at least one of a resistive-type sensitive surface and capacitive-type sensitive surface.

7. Luminaire according to claim 1, wherein the positioning information is indicative of an area of touch of the user touching the touch-sensitive member.

8. Luminaire according to claim 1, further comprising at least one of a moisture sensor, a microphone and a vibration sensor for providing sensing information to the control unit, and the control unit is further configured to provide further control of the plurality of controllable light sources according to the sensing information.

9. Luminaire according to claim 1, further comprising communication means connected to the control unit and configured to provide at least one of the determined touch pattern and the selected illumination pattern to a corresponding luminaire.

10. Luminaire according to claim 1, wherein the plurality of predetermined illumination patterns are stored by the control unit, wherein the positioning information is indicative of the positions of the points of touch, and wherein the selection of the plurality of predetermined illumination patterns is dependent upon the positions of the points of touch.

11. Luminaire according to claim 1, wherein the plurality of predetermined illumination patterns are stored by the control unit.

12. Method for controlling an illumination pattern of a luminaire, the luminaire comprising a plurality of controllable light sources, configured to emit light towards the external surrounding of the luminaire, and a touch-sensitive member, the method comprising:
  detecting positions of points of touch of a user touching the touch sensitive member;
  determining a touch pattern based on the points of touch;
  selecting one of a plurality of predetermined illumination patterns corresponding to the determined touch pattern; and
  controlling the plurality of controllable light sources according to the selected illumination pattern,
  wherein the luminaire is configured in a lamp shade shape and wherein the method further comprises emitting light from the plurality of controllable light sources inwards towards an internal space of said lamp shade shape to form a lamp bulb illumination pattern.

13. Method according to claim 12, further comprising detecting an area of touch of the user touching the touch-sensitive member.

14. Method according to claim 12, wherein the determination of a touch pattern comprises detecting a duration of touch.

15. Method according to any one of claim 12, wherein the plurality of predetermined illumination patterns comprises selective variation of the intensity of the light sources, selective variation of the color emitted by the light sources, and selective activation of the light sources.

16. Method according to claim 12, wherein the plurality of predetermined illumination patterns are stored illumination patterns and wherein the selecting is dependent upon the detected positions.

17. Method according to claim 12, wherein the plurality of predetermined illumination patterns are stored illumination patterns.

* * * * *